(12) United States Patent
Sihn et al.

(10) Patent No.: US 9,846,530 B2
(45) Date of Patent: Dec. 19, 2017

(54) APPARATUS AND METHOD FOR DISPLAYING NOTIFICATION IN ELECTRONIC DEVICE

(71) Applicant: Samsung Electronics Co., Ltd., Suwon-si, Gyeonggi-do (KR)

(72) Inventors: Kue-Hwan Sihn, Suwon-si (KR); Beyong-Ho Yuu, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 513 days.

(21) Appl. No.: 14/528,442

(22) Filed: Oct. 30, 2014

(65) Prior Publication Data
US 2015/0121281 A1  Apr. 30, 2015

(30) Foreign Application Priority Data
Oct. 30, 2013  (KR) .................. 10-2013-0130488

(51) Int. Cl.
G06F 3/0488 (2013.01)
G06F 3/0484 (2013.01)
G06F 3/0481 (2013.01)
G06F 3/0482 (2013.01)

(52) U.S. Cl.
CPC ........ *G06F 3/04842* (2013.01); *G06F 3/0481* (2013.01); *G06F 3/0482* (2013.01); *G06F 3/0488* (2013.01); *G06F 3/04817* (2013.01); *G06F 3/04883* (2013.01)

(58) Field of Classification Search
CPC ............. G06F 3/04842; G06F 3/0481; G06F 3/04817; G06F 3/0482; G06F 3/0488; G06F 3/04883
See application file for complete search history.

(56) References Cited

U.S. PATENT DOCUMENTS

| | | | | |
|---|---|---|---|---|
| 2009/0247112 | A1* | 10/2009 | Lundy | G06F 3/0237 455/404.1 |
| 2009/0249247 | A1* | 10/2009 | Tseng | H04M 1/72552 715/808 |
| 2013/0077774 | A1 | 3/2013 | Lynch, III | |
| 2013/0145303 | A1* | 6/2013 | Prakash | G06F 3/04883 715/779 |
| 2013/0290986 | A1* | 10/2013 | Kobayashi | G06F 3/01 719/318 |
| 2015/0113422 | A1* | 4/2015 | Pfeiffer | G06F 19/327 715/739 |

FOREIGN PATENT DOCUMENTS

WO   2012/172164 A1   12/2012

OTHER PUBLICATIONS

XP055178799 "For Android TM mobile technology platform", Dec. 31, 2012.

(Continued)

*Primary Examiner* — Anil Bhargava
(74) *Attorney, Agent, or Firm* — Jefferson IP Law, LLP

(57) ABSTRACT

An apparatus and a method of displaying a notification in an electronic device are provided. The apparatus includes a display unit configured to display a status bar including one or more notification icons, and a controller configured to display notification information including an icon and a number of notifications of an application program for each application program when the status bar is selected.

16 Claims, 10 Drawing Sheets

(56) References Cited

OTHER PUBLICATIONS

XP054975805 "Android 4.1 Jelly Bean notifications", Jul. 12, 2012.
XP055179627 "Android 4.1 (Jelly Bean) review- Androids sweetest flavor yet-Mobile News-nsane.forums", Jul. 18, 2012.
XP055180553 "A Really, Really, Really Good Introduction to XML", Aug. 24, 2005.

* cited by examiner

APPARATUS AND METHOD FOR DISPLAYING NOTIFICATION IN ELECTRONIC DEVICE

CROSS-REFERENCE TO RELATED APPLICATION(S)

This application claims the benefit under 35 U.S.C. §119 (a) of a Korean patent application filed on Oct. 30, 2013 in the Korean Intellectual Property Office and assigned Serial number 10-2013-0130488, the entire disclosure of which is hereby incorporated by reference.

TECHNICAL FIELD

The present disclosure relates to an electronic device. More particularly, the present disclosure relates to an apparatus and a method of displaying a notification in an electronic device.

BACKGROUND

Electronic devices, such as a smart phone, a personal computer, and a tablet computer, provide various useful functions to users through various applications. Those devices are evolving into devices with support for using various types of information together with a voice call (telephone) function through the provision of various functions. For example, the electronic device may provide a notification function of displaying a notification icon for notifying on a status bar that an email or a message is received or an event is generated when receiving the email or the message from the outside or including the event generated therein, and displaying a notification list related to the notification icon when the status bar is selected by a user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for a problem arising from different types of notification mixed in the display of the notification list, in that it is difficult for a user to clearly recognize the notification information. Further, when the number of notifications exceeds an allowable number of notifications to be displayed on a screen of the electronic device, a user must inconveniently search for notification information by scrolling until the desired notification information is found.

An aspect of the present disclosure is to provide an apparatus and a method of displaying a notification in an electronic device for improving a user's convenience for notification information.

In accordance with an aspect of the present disclosure, an apparatus for displaying a notification in an electronic device is provided. The apparatus includes a display unit configured to display a status bar including one or more notification icons, and a controller configured to display notification information including an icon and the number of notifications of an application program for each application program when the status bar is selected.

In accordance with another aspect of the present disclosure, an apparatus for displaying a notification in an electronic device is provided. The apparatus includes a display unit configured to display a status bar including one or more notification icons, and a controller configured to display an icon of an application program, summary information about the predetermined number of notification icons, and a detail extension indicator making a request for extension of the summary information for each application program when the status bar is selected.

In accordance with another aspect of the present disclosure, a method of displaying a notification in an electronic device is provided. The method includes displaying a status bar including one or more notification icons, and displaying notification information including an icon and the number of notifications of an application program for each application program when the status bar is selected.

In accordance with another aspect of the present disclosure, a method of displaying a notification in an electronic device is provided. The method includes displaying a status bar including one or more notification icons, and displaying an icon of an application program, summary information about the predetermined number of notification icons, and a detail extension indicator making a request for extension of the summary information for each application program when the status bar is selected.

Accordingly, according to the various embodiments of the present disclosure, there is suggested the apparatus and the method of displaying a notification in an electronic device, thereby improving user's convenience for the notification information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to various embodiments of the present disclosure is an easily portable mobile electronic device, and may be, for example, a video phone, a mobile phone, a smart phone, an International Mobile Telecommunication 2000 (IMT-2000) terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an Electronic (E)-Book, a portable computer (for example, a notebook computer or a tablet computer), or a digital camera.

Figure 1:
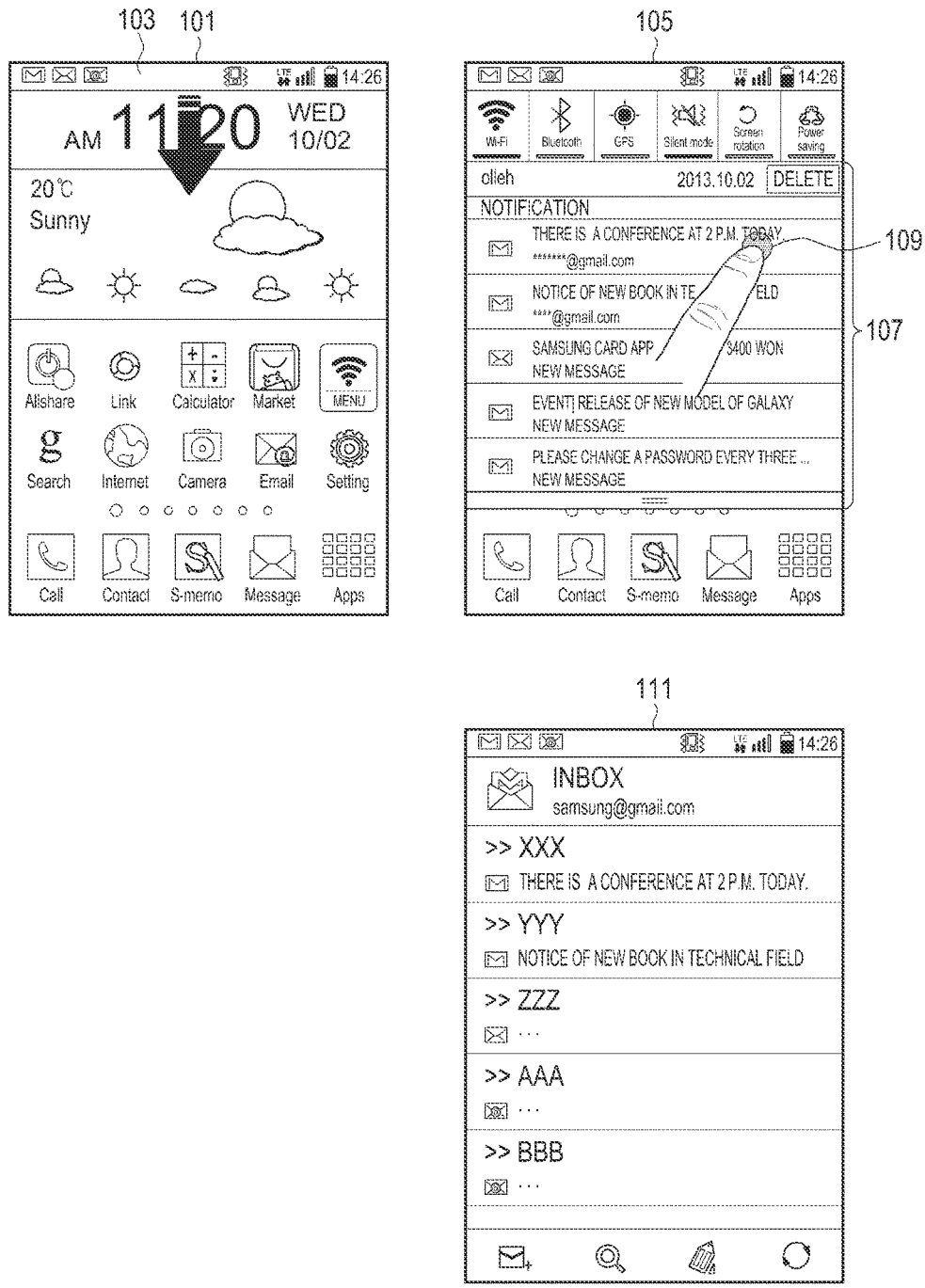
FIG. 1 is a view illustrating a screen on which a notification is displayed according to the related art.

FIG. 1 is a view illustrating a screen on which a notification is displayed according to the related art.

Referring to FIG. 1, when an email (for example, in Gmail or an e-mail application set by a user), a text message (for example, a short message, a multimedia message, or an instant message), or a game message is received from the outside or an event is generated, an electronic device may display a status bar 103 including at least one notification icon for notifying of reception of the message or the email, or generation of the event as shown on the screen 101.

Further, when the status bar 103 is selected by the user, the electronic device may display a notification list 107 as depicted on the screen 105. For example, when a gesture is input on the status bar 103, the electronic device may determine that the status bar 103 is selected. Here, the gesture may be a touch, a double touch, a long touch, a slide down, or the like. For example, when a slide down is input on the status bar 103 of the screen 101, the electronic device may determine that the status bar 103 is selected. Here, the notification list 107 may display an icon of a specific application program for providing a corresponding message or a corresponding event for each corresponding message or the corresponding event, and at least one element of notification information including summary information about the corresponding message or event, a reception time of the corresponding message, or a generation time of the event.

Further, the electronic device may execute a specific application program corresponding to notification information when any one element of information 109 among one or more elements of notification information included in the notification list 107 is selected by the user. For example, when notification information corresponding to Gmail is selected as depicted in the screen 105, the electronic device may execute the corresponding application program, that is, Gmail, as depicted in the selection 109. The user can then access the message within the corresponding application, for example, Gmail, as depicted in screen 111.

Figure 2A:
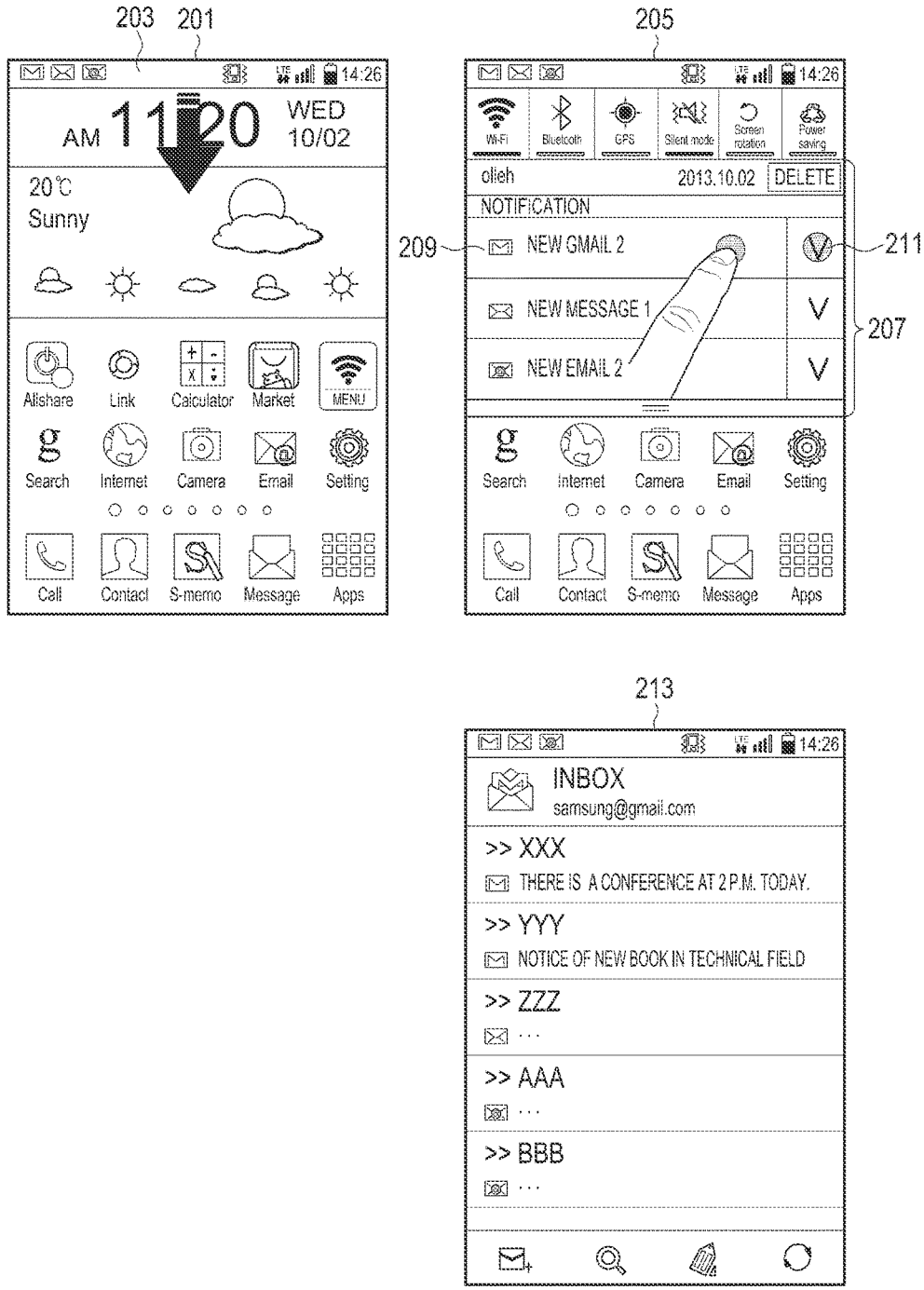
FIGS. 2A and 2B are views illustrating a screen on which a notification is displayed according to a first embodiment of the present disclosure.
Figure 2B:
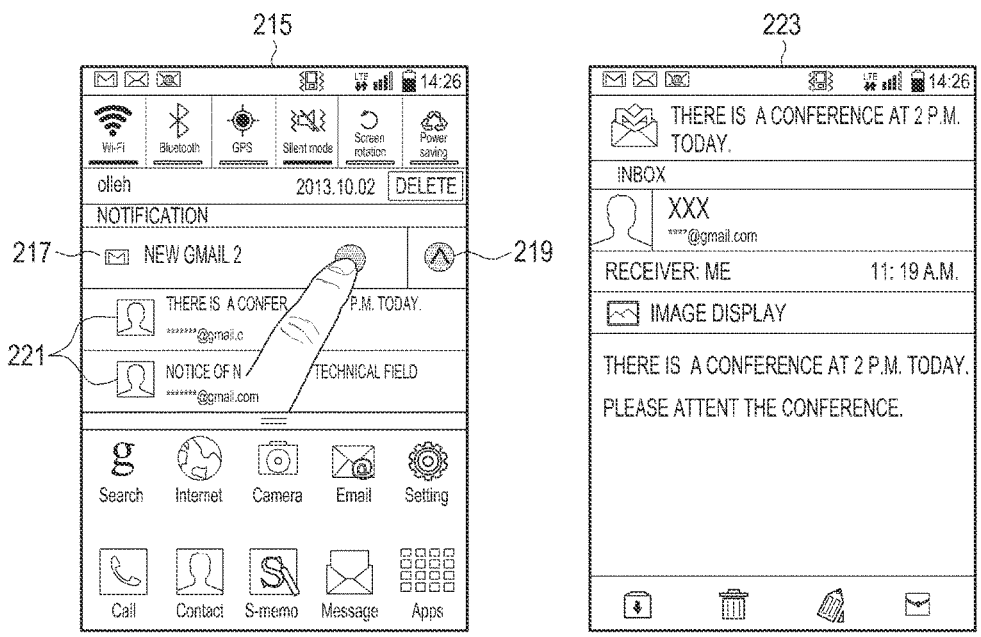

FIGS. 2A and 2B are views illustrating a screen on which a notification is displayed according to a first embodiment of the present disclosure.

Referring to FIGS. 2A and 2B, when an email (for example, in Gmail or an e-mail application set by a user), a text message (for example, a short message, a multimedia message, or an instant message), or a game message is received from the outside or an event is generated as depicted in a screen 201, an electronic device may display a status bar 203 including at least one notification icon for notifying of reception of the message or the email, or generation of the event.

Further, when the status bar 203 is selected by the user, the electronic device may display a notification list 207 as depicted in screen 205. For example, when a gesture is input on the status bar 203, the electronic device may determine that the status bar 203 is selected. Here, the gesture may be a touch/tap, a double touch/tap, a long touch, a slide down, or the like. For example, when a slide down is input on the status bar 203 like the screen 201, the electronic device may determine that the status bar 203 is selected.

Here, the notification list 207 may include one or more elements of notification information including an icon of a specific application program providing a received message or a generated event, the number of notifications, and a detail open indicator for each application program. Further, the number of notifications represents the number of received messages or the number of generated events for the specific application program, and the detail open indicator refers to an indicator making a request for displaying of summary information about the message received or the generated event for the specific application program.

Further, when any one among the icon and the number of notifications for the specific application program among one or more elements of the notification information included in the notification list 207 is selected by the user, the electronic device may execute the corresponding specific application program. For example, when the number of notifications 209 corresponding to Gmail is selected in the screen 205, the electronic device may execute the application program, that is, Gmail, as depicted in the screen 213.

Otherwise, when a detail open indicator 211 for a specific application program is selected among one or more elements of notification information included in the notification list 207, the electronic device may display summary information for each notification and a detail close indicator for the specific application program. Here, the summary information for each notification refers to the summary information for the received message or the generated event, and the detail close indicator refers to an indicator making a request for closing of the display for the summary information for each notification corresponding to the received message or the generated event related to the specific application program.

For example, when the detail open indicator 211 for Gmail is selected in the screen 205, the electronic device may display an icon and the number of notifications 217 of Gmail, a detail close indicator 219, and summary information 221 corresponding to a plurality of received emails related to Gmail as depicted in the screen 215.

Further, when a detail close indicator 219 for a specific application program is selected by the user, the electronic device may display notification information for each specific application program without displaying summary information for each notification for the application program. For example, when the detail close indicator 219 corresponding to Gmail is selected as depicted in the screen 215, the electronic device may display notification information for each application program again as depicted in the screen 205.

Otherwise, when one element of summary information is selected among summary information for each notification for a specific application program by the user, the electronic device may execute the specific application program, and then display data corresponding to the selected summary information. For example, when one element of summary information is selected among summary information for each notification corresponding to Gmail in the screen 215, the electronic device may execute the Gmail application, and then display an email corresponding to the selected summary information as depicted in the screen 223.

Figure 3A:
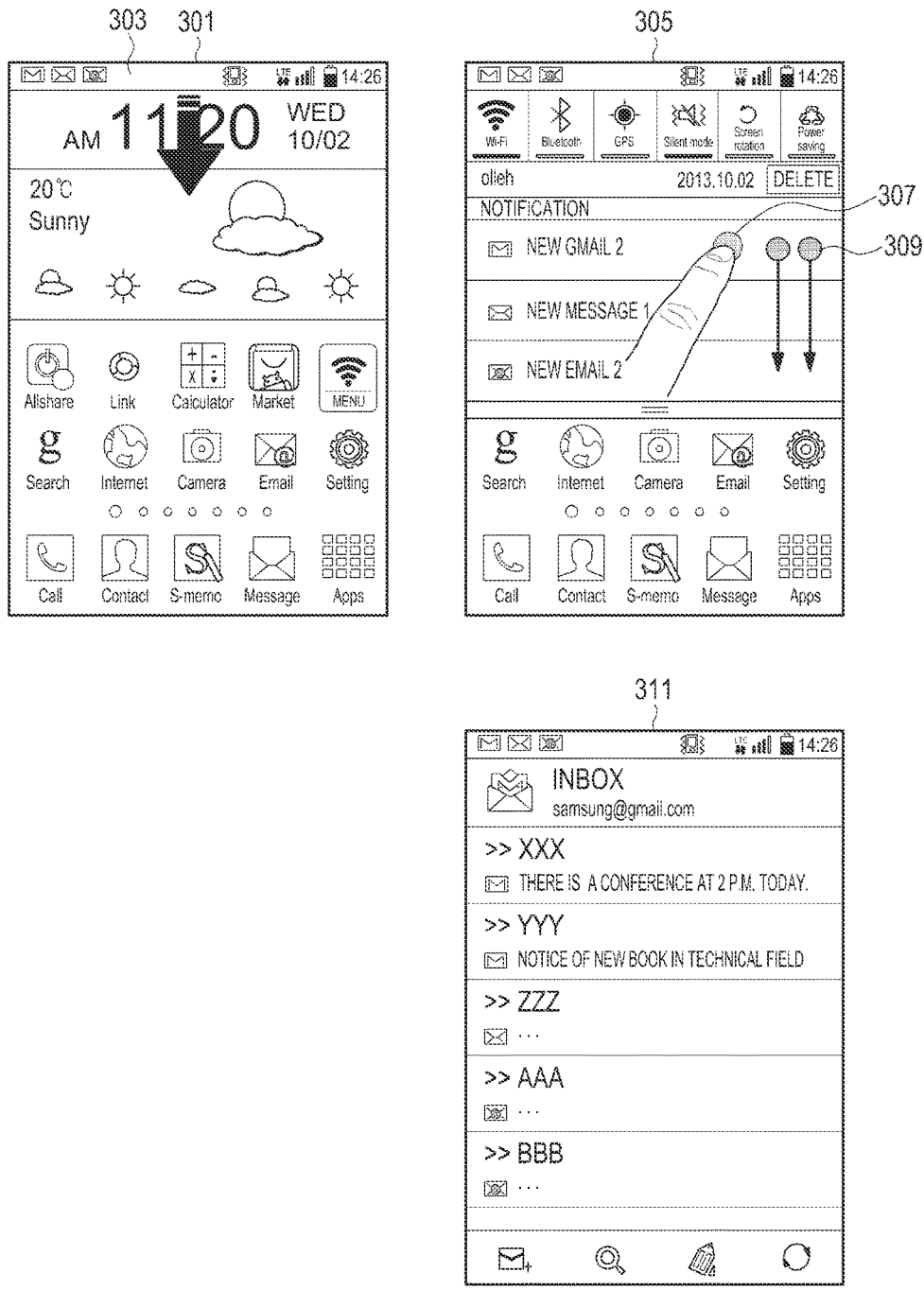
FIGS. 3A and 3B are views illustrating a screen on which a notification is displayed according to a second embodiment of the present disclosure.
Figure 3B:
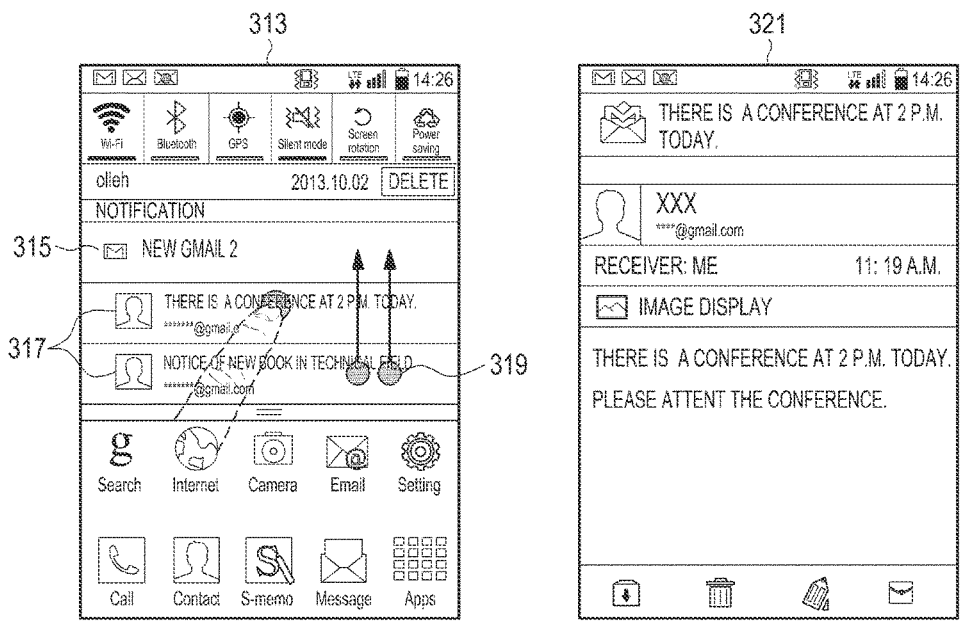

FIGS. 3A and 3B are views illustrating a screen on which a notification is displayed according to a second embodiment of the present disclosure.

Referring to FIGS. 3A and 3B, when an email (for example, in Gmail or an e-mail application set by a user), a text message (for example, a short message, a multimedia message, or an instant message), or a game message is received from the outside or an event is generated as depicted in screen 301, an electronic device may display a status bar 303 including at least one notification icon for notifying of reception of the message or the email, or generation of the event.

Further, when the status bar 303 is selected by the user, the electronic device may display a notification list as depicted in screen 305. For example, when a gesture is input on the status bar 303, the electronic device may determine that the status bar 203 is selected. Here, the gesture may be a touch/tap, a double touch/tap, a long touch, a slide down, or the like. For example, when a slide down is input on the status bar 303 like the screen 301, the electronic device may determine that the status bar 303 is selected.

Here, the notification list may include an icon of a specific application program providing the received message or the generated event and the number of notifications for each application program. Further, the number of notifications may represent the number of received messages or the number of generated events for the specific application program.

Further, when any one among the icon and the number of notifications for the specific application program is selected among one or more elements of the notification information included in the notification list 307 by the user, the electronic device may execute the corresponding specific application program. For example, when the number of notifications 307 corresponding to Gmail is selected in the screen 305, the electronic device may execute the application program, that is, Gmail, as depicted in the screen 311.

Otherwise, when a first gesture is input on one or more elements of notification information included in the notification list by the user, the electronic device may display summary information for each notification for a specific application program. For example, the first gesture may be a two-touch slide down. Here, the summary information for each notification refers to summary information about the received message or the generated event. For example, when a two-touch slide down 309 is input on notification information for Gmail in a screen 305, the electronic device may display an icon and the number of notifications 315 of Gmail, and summary information 317 corresponding to a plurality of received emails related to Gmail as depicted in a screen 313.

Further, when a second gesture is input on summary information for each notification for a specific application program by the user, the electronic device may display notification information for each application program without displaying summary information for each notification for the specific application program. For example, the second gesture may be a two-touch slide up. For example, when a two-touch slide up 319 is input on summary information for each notification corresponding to Gmail in the screen 313, the electronic device may display notification information for each application program again as depicted in the screen 305.

Otherwise, when one element of summary information is selected among summary information for each notification for a specific application program by the user, the electronic device may execute the specific application program, and then display data corresponding to the selected summary information. For example, when one element of summary information is selected among summary information for each notification corresponding to Gmail in the screen 313, the electronic device may execute Gmail, and then display an email corresponding to the selected summary information as depicted in the screen 321.

Figure 4:
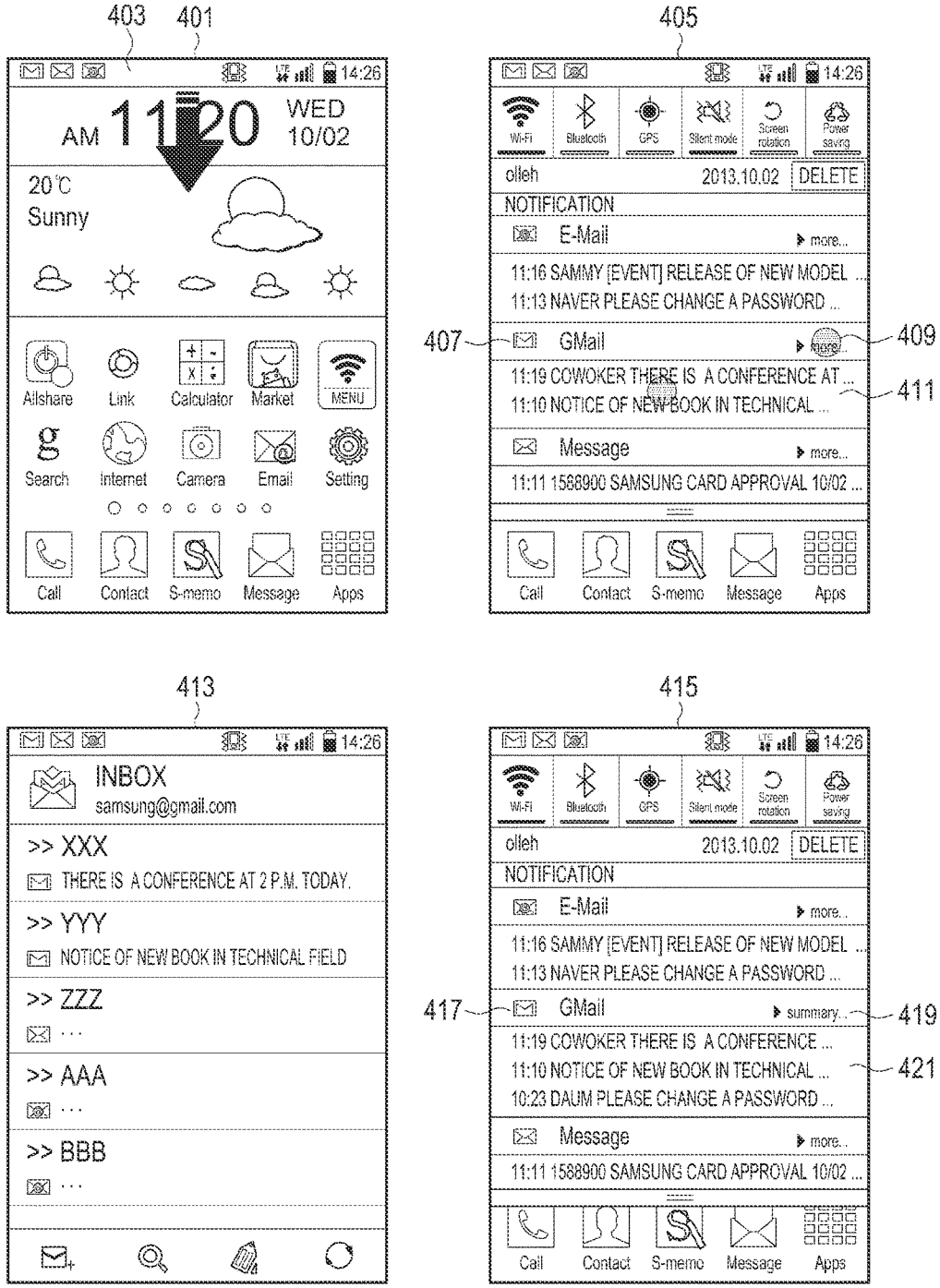
FIG. 4 is a view illustrating a screen on which a notification is displayed according to a third embodiment of the present disclosure.

FIG. 4 is a view illustrating a screen on which a notification is displayed according to a third embodiment of the present disclosure.

Referring to FIG. 4, when an email (for example, in Gmail or an e-mail application set by a user), a text message (for example, a short message, a multimedia message, or an instant message), or a game message is received from the outside or an event is generated as depicted in a screen 401, an electronic device may display a status bar 403 including at least one notification icon for notifying of reception of the message or the email, or generation of the event.

Further, when the status bar 403 is selected by the user, the electronic device may display a notification list as depicted in a screen 405. For example, when a gesture is input on the status bar 403, the electronic device may determine that the status bar 403 is selected. Here, the gesture may be a touch/tap, a double touch/tap, a long touch, a slide down, or the like. For example, when a slide down is input on the status bar 403 like the screen 401, the electronic device may determine that the status bar 403 is selected.

Here, the notification list may include an icon 407 of a specific application program providing a received message or a generated event for each application program, the predetermined number of elements of summary information 411 about a received message or a generated event related to a specific application program, and a summary extension indicator 409 making a request for extension of the predetermined number of elements of summary information.

Further, the electronic device may execute a specific application program corresponding to notification information when any one element of information 411 among notification information for each application program included in the notification list is selected by the user. For example, when summary information corresponding to Gmail is selected in a screen 405, the electronic device may execute the corresponding application program, that is, Gmail, as depicted in the screen 413.

Otherwise, when a summary extension indicator for a specific application program is selected by the user, the electronic device may display an icon 417, summary information for entire notifications 421, and a summary reduction indicator 419 for the specific application program. For example, when the summary extension indicator 409 for Gmail is selected in the screen 405, the electronic device may display the icon 417, the summary information for entire notifications 421, and the summary reduction indicator 419 for Gmail as depicted in a screen 415.

Further, the when the summary information for the entire notifications 421 for the specific application program is selected by the user, the electronic device may execute the specific application program corresponding to the summary information for the entire notifications. For example, when the summary information for the entire notifications 421 corresponding to Gmail is selected in the screen 415, the electronic device may execute the application program, that is, Gmail, like the screen 413.

Otherwise, when the summary reduction indicator 419 for the specific application program is selected by the user, the electronic device may display the predetermined number of elements of summary information 411 without displaying the summary information for the entire notifications. For example, when the summary reduction indicator 419 corresponding to Gmail is selected in the screen 415, the electronic device may display the predetermined number of elements of summary information of the emails for Gmail like the screen 405.

Figure 5:
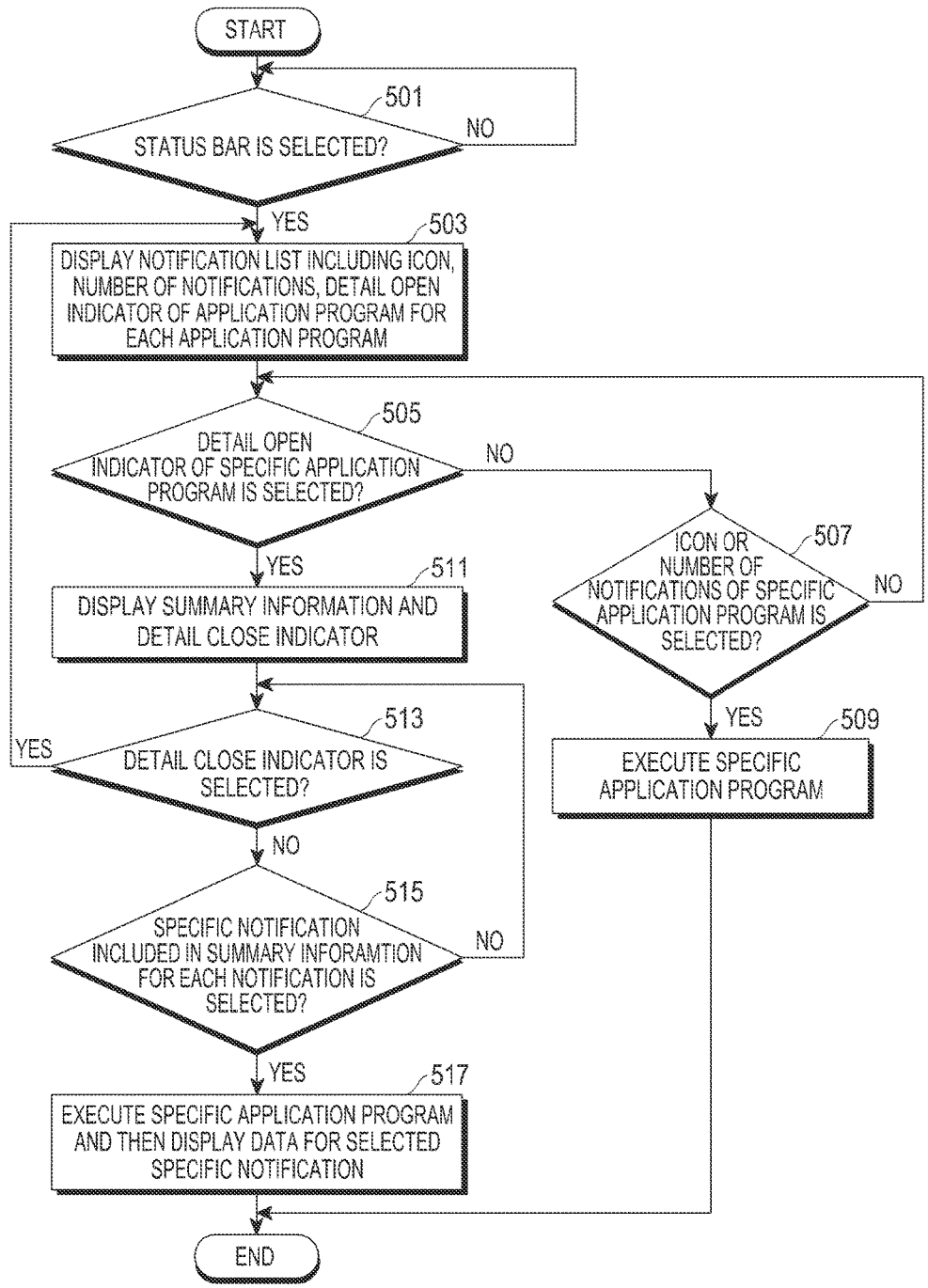
FIG. 5 is a flowchart illustrating a method of displaying of a notification in an electronic device according to the first embodiment of the present disclosure.

FIG. 5 is a flowchart illustrating a method of displaying of a notification in the electronic device according to the first embodiment of the present disclosure.

Referring to FIG. 5, in operation 501, the electronic device may identify whether the displayed status bar is selected by a user. Here, when an email (for example, in Gmail or an e-mail application set by a user), a text message (for example, a short message, a multimedia message, or an instant message), or a game message is received from the outside or an event is generated, the status bar may include at least one notification icon for notifying of reception of the message or the email, or generation of the event. For example, when a slide down is input on the status bar 203 like the screen 201, the electronic device may determine that the status bar 203 is selected.

When the status bar is selected, the electronic device proceeds to operation 503, and when the status bar is not selected, the electronic device may repeatedly perform in operation 501.

When the electronic device proceeds to operation 503, the electronic device may display a notification list, and then may proceed to operation 505. Here, the notification list may include one or more elements of notification information including an icon of a specific application program providing a received message or a generated event, the number of notifications, and a detail open indicator for each application program. Further, the number of notifications may represent the number of received messages or the number of generated events for the specific application program, and the detail open indicator refers to an indicator making a request for displaying of summary information about the received message or the generated event for the specific application program.

In operation 505, the electronic device may identify whether the detail open indicator for the specific application program is selected among one or more elements of notification information included in the notification list by the user.

When the detail open indicator is selected, the electronic device may proceed to operation 511, and when the detail open indicator is not selected, the electronic device may proceed to operation 507.

When the electronic device proceeds to operation 507, the electronic device may identify whether any one among the icon and the number of notifications for the specific application program is selected among one or more elements of notification information included in the notification list by the user.

When any one among the icon and the number of notifications for the specific application program is selected, the electronic device may proceed to operation 509, and when any one among the icon and the number of notifications for the specific application program is not selected, the electronic device may proceed to operation 505.

When the electronic device proceeds to operation 509, the electronic device may execute the specific application program corresponding to the selected icon or the number of notifications. For example, when the number of notifications 209 corresponding to Gmail is selected in the screen 205, the electronic device may execute an application program, that is, Gmail, as depicted in the screen 213.

When the electronic device proceeds to operation 511, the electronic device may display summary information for each notification and a detail close indicator for the specific application program, and proceed to operation 513. Here, the summary information for each notification refers to the summary information for the received message or the generated event, and the detail close indicator refers to an indicator making a request for closing of the display for the summary information for each notification corresponding to the received message or the generated event related to the specific application program.

For example, when the detail open indicator 211 for Gmail is selected in the screen 205, the electronic device may display an icon and the number of notifications 217 of Gmail, the detail close indicator 219, and summary information 221 corresponding to a plurality of received emails related to Gmail like the screen 215.

Then, in operation 513, the electronic device may identify whether a detail close indicator for the specific application program is selected by the user. When the detail close indicator for the specific application program is selected, the electronic device may proceed to operation 503, and when the detail close indicator is not selected, the electronic device may proceed to operation 515.

When the electronic device proceeds to operation 515, the electronic device may identify whether one element of summary information is selected among summary information for each notification for the specific application program by the user. When the summary information is selected, the electronic device may proceed to operation 517, and when the summary information is not selected, the electronic device may proceed to operation 513.

When the electronic device proceeds to operation 517, the electronic device may execute the specific application program related to the selected summary information, and then display data corresponding to the selected summary information. For example, when one element of summary information is selected among summary information for each notification corresponding to Gmail in the screen 215, the electronic device may execute Gmail, and then display an email corresponding to the selected summary information as depicted in the screen 223.

Figure 6:
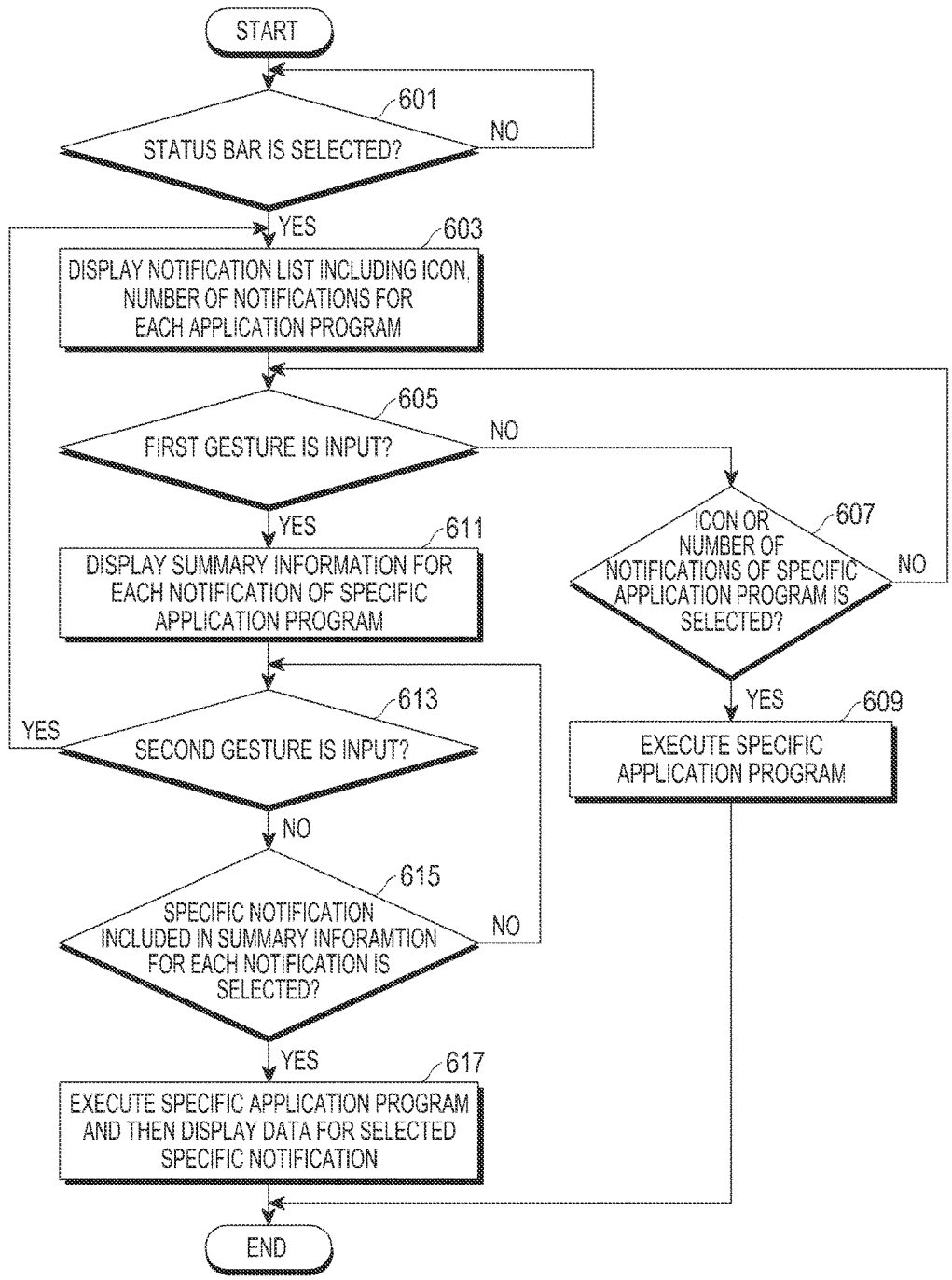
FIG. 6 is a flowchart illustrating a method of displaying of a notification in an electronic device according to the second embodiment of the present disclosure.

FIG. 6 is a flowchart illustrating a method of displaying of a notification in the electronic device according to the second embodiment of the present disclosure.

Referring to FIG. 6, in operation 601, the electronic device may identify whether a displayed the status bar is selected by a user. Here, when an email (for example, in Gmail or an e-mail application set by a user), a text message (for example, a short message, a multimedia message, or an instant message), or a game message is received from the outside or an event is generated, the status bar may include at least one notification icon for notifying of reception of the message or the email, or generation of the event. For example, when a slide down is input on the status bar 303 as depicted in the screen 301, the electronic device may determine that the status bar 303 is selected.

When the status bar is selected, the electronic device proceeds to operation 603, and when the status bar is not selected, the electronic device may repeatedly perform operation 601.

When the electronic device proceeds to operation 603, the electronic device may display a notification list, and then may proceed to operation 605. Here, the notification list may include an icon of a specific application program providing the received message or the generated event and the number of notifications for each application program. Further, the number of notifications may represent the number of received messages or the number of generated events for the specific application program.

In operation 605, the electronic device may identify whether a first gesture is input on one or more elements of notification information included in a notification list by the user. Here, the first gesture may be a two-touch slide down.

When the first gesture is input, the electronic device may proceed to operation 611, and when the first gesture is not selected, the electronic device may proceed to operation 607.

When the electronic device proceeds to operation 607, the electronic device may identify whether any one among the icon and the number of notifications for the specific application program is selected among one or more elements of notification information included in the notification list by the user.

When any one among the icon and the number of notifications for the specific application program is selected, the electronic device may proceed to operation 609, and when any one among the icon and the number of notifications for the specific application program is not selected, the electronic device may proceed to operation 605.

When the electronic device proceeds to operation 609, the electronic device may execute the specific application program corresponding to the selected icon or the number of notifications. For example, when the number of notifications 307 corresponding to Gmail is selected in the screen 305, the electronic device may execute an application program, that is, Gmail, as depicted in the screen 311.

When the electronic device proceeds to operation 611, the electronic device may display summary information for each notification for the specific application program, and proceed to operation 613. Here, the summary information for each notification refers to summary information about the received message or the generated event. For example, when the two-touch slide down 309 is input on notification information for Gmail in a screen 305, the electronic device may display an icon and the number of notifications 315 of Gmail, and summary information 317 corresponding to a plurality of received emails related to Gmail as depicted in the screen 313.

In operation 613, the electronic device may identify whether a second gesture is input on summary information for each notification for the specific application program by the user. For example, the second gesture may be a two-touch slide up.

When the second gesture is input, the electronic device may proceed to operation 603, and when the second gesture is not selected, the electronic device may proceed to operation 615.

When the electronic device proceeds to operation 615, the electronic device may identify whether one element of summary information is selected among summary information for each notification for the specific application program by the user. When the summary information is selected, the electronic device may proceed to operation 617, and when the summary information is not selected, the electronic device may proceed to operation 613.

When the electronic device proceeds to operation 617, the electronic device may execute the specific application program related to the selected summary information, and then display data corresponding to the selected summary information. For example, when one element of summary information is selected among summary information for each notification corresponding to Gmail in the screen 313, the electronic device may execute Gmail, and then display an email corresponding to the selected summary information as depicted in the screen 321.

Figure 7:
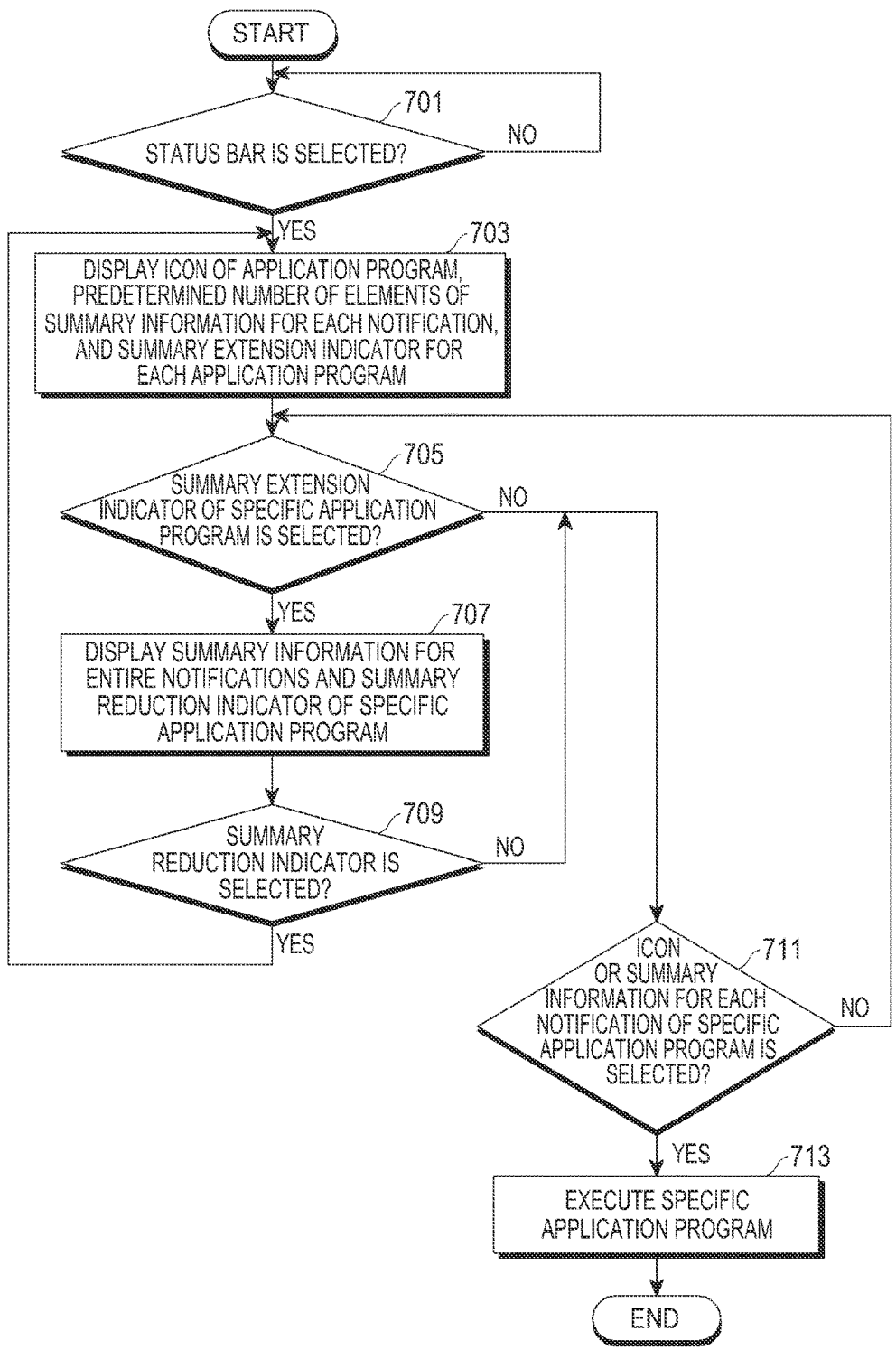
FIG. 7 is a flowchart illustrating a method of displaying of a notification in an electronic device according to the third embodiment of the present disclosure.

FIG. 7 is a flowchart illustrating a method of displaying of a notification in the electronic device according to the third embodiment of the present disclosure.

Referring to FIG. 7, in operation 701, the electronic device may identify whether the status bar is selected by a user. Here, when an email (for example, in Gmail or an e-mail application set by a user), a text message (for example, a short message, a multimedia message, or an instant message), or a game message is received from the outside or an event is generated, the status bar may include at least one notification icon for notifying of reception of the message or the email, or generation of the event. For example, when a slide down is input on the status bar 403 as depicted in the screen 401, the electronic device may determine that the status bar 403 is selected.

When the status bar is selected, the electronic device proceeds to operation 703, and when the status bar is not selected, the electronic device may repeatedly perform operation 701.

When the electronic device proceeds to operation 703, the electronic device may display a notification list, and then may proceed to operation 705. Here, the notification list may include an icon of a specific application program providing a received message or a generated event for each application program, the predetermined number of elements of summary information about a received message or a generated event related to a specific application program, and a summary extension indicator making a request for extension of the predetermined number of elements of summary information.

In operation 705, the electronic device may identify whether the summary extension indicator for the specific application program is selected among one or more elements of notification information included in the notification list by the user. When the summary extension indicator is selected, the electronic device may proceed to operation 707, and when the summary extension indicator is not selected, the electronic device may proceed to operation 711.

When the electronic device proceeds to operation 707, the electronic device may display summary information for entire notifications and a summary reduction indicator for the specific application program, and proceed then to operation 709. For example, when the summary extension indicator 409 for Gmail is selected in the screen 405, the electronic device may display the icon 417, the summary information for entire notifications 421, and the summary reduction indicator 419 for Gmail as depicted in screen 415.

Then, in operation 709, the electronic device may identify whether the detail reduction indicator for the specific application program is selected by the user. When the summary reduction indicator is selected, the electronic device may proceed to operation 703, and when the summary extension indicator is not selected, the electronic device may proceed to operation 711.

When the electronic device proceeds to operation 711, the electronic device may identify whether the icon, the predetermined number of elements of summary information, or the summary information for the entire notifications for the specific application program included in the notification list is selected by the user.

When any one among the icon, the predetermined number of elements of summary information, and the summary information for the entire notifications for the specific application program is selected, the electronic device may proceed to operation 713, and when any one among the icon, the predetermined number of elements of summary information, and the summary information for the entire notifications for the specific application program is not selected, the electronic device may proceed to operation 705.

When the electronic device proceeds to operation 713, the electronic device may execute the specific application program corresponding to the selected icon, the number of notifications, or the summary information for the entire notifications. For example, when the summary information for the entire notifications 421 corresponding to Gmail is selected in the screen 415, the electronic device may execute the application program, that is, Gmail, as depicted in the screen 413.

Figure 8:
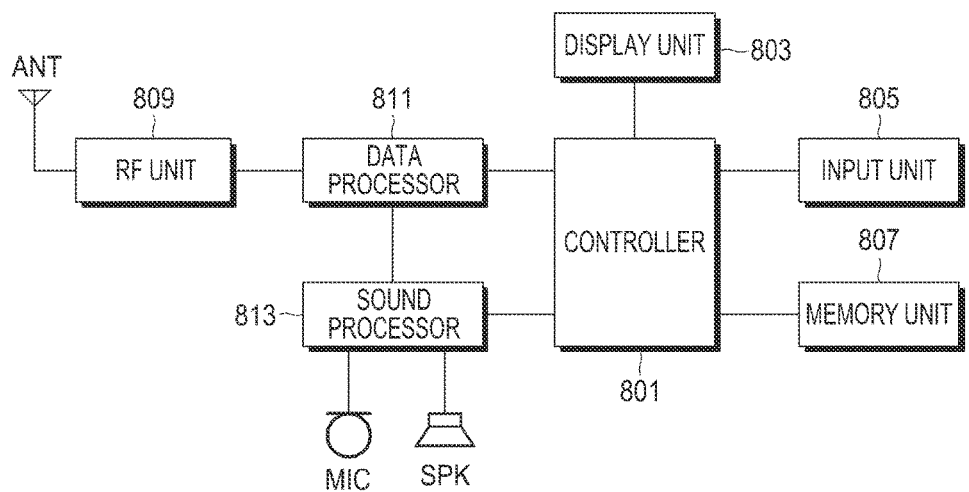
FIG. 8 is a block diagram illustrating the electronic device according to various embodiments of the present disclosure.

FIG. 8 is a block diagram illustrating the electronic device according to various embodiments of the present disclosure.

Referring to FIG. 8, the electronic device includes a controller 801, a display unit 803, an input unit 805, a memory unit 807, a Radio Frequency (RF) unit 809, a data processor 811, and a sound processor 813.

Each constituent element will be described. The RF unit 809 serves to perform wireless communication of the electronic device. More particularly, the RF unit 809 includes a wireless transmitter for up-converting and amplifying a frequency of a transmitted signal and a wireless receiver for low noise-amplifying a received signal and down-converting a frequency. Further, the data processor 811 includes a transmitter for encoding and modulating a transmitted signal and a receiver for decoding and demodulating a received signal. Here, the data processor 811 may include a modem and a codec, and the codec may include a data codec for processing packet data and an audio codec for processing an audio signal such as a voice.

The audio processor 813 performs a function of reproducing a received audio signal output from the data processor 811 through a speaker SPK or transmitting a transmitted audio signal generated from a microphone MIC to the data processor 811. Further, the input unit 805 includes keys for inputting number and character information and function keys for setting various functions, and the display unit 803 displays an image signal on a screen and displays data requested to be output from the controller 801. When the display unit 803 is implemented in a capacitive touch display screen type or a resistive touch display screen type, the input unit 805 may include only the predetermined minimum number of keys and the display unit 803 may partially replace key input functions of the input unit 805.

The memory unit 807 includes a program memory and a data memory. Here, the program memory stores a booting and Operating System (OS) for controlling a general operation of the electronic device, and the data memory stores various data generated during an operation of the electronic device.

Further, the controller 801 performs a function of controlling a general operation of the electronic device. For example, when the status bar is selected by the user according to the first to third embodiments, the controller 801 may display the notification information about the notification icon included in the status bar.

In the first embodiment, when an email (for example, in Gmail or an e-mail application set by a user), a text message (for example, a short message, a multimedia message, or an instant message), or a game message is received from the outside or an event is generated, the controller 801 may display the status bar including at least one notification icon for notifying of reception of the message or the email, or generation of the event.

Further, when the status bar is selected by the user, the controller 801 may display the notification list. For example, when a gesture is input on the status bar, the controller 801 may determine that the status bar is selected. Here, the gesture may be a touch/tap, a double touch/tap, a long touch, a slide down, or the like. For example, when a slide down is input on the status bar 203 as depicted in the screen 201 of FIG. 2, the controller 801 may determine that the status bar 203 is selected.

Here, the notification list may include one or more elements of notification information including an icon of a specific application program providing a received message or a generated event, the number of notifications, and a detail open indicator for each application program. Further, the number of notifications may represent the number of received messages or the number of generated events for the specific application program, and the detail open indicator refers to an indicator making a request for displaying of summary information about the message received or the generated event for the specific application program.

Further, when any one among an icon and the number of notifications for the specific application program is selected among one or more elements of the notification information included in the notification list by the user, the controller 801 may execute the specific application program. For example, when the number of notifications 209 corresponding to Gmail is selected in the screen 205 of FIG. 2, the controller 801 may execute a corresponding application program, that is, Gmail, as depicted in the screen 213.

Otherwise, when the detail open indicator for the specific application program is selected among one or more elements of notification information included in the notification list, the controller 801 may display summary information for each notification and the detail close indicator for the specific application program. Here, the summary information for each notification refers to the summary information for the received message or the generated event, and the detail close indicator refers to an indicator making a request for closing of the display for the summary information for each notification corresponding to the received message or the generated event related to the specific application program.

For example, when the detail open indicator 211 for Gmail is selected in the screen 205 of FIG. 2, the controller 801 may display the icon and the number of notifications 217 of Gmail, the detail close indicator 219, and summary information 221 corresponding to a plurality of received emails related to Gmail as depicted in the screen 215.

Further, when the detail close indicator for the specific application program is selected by the user, the controller 801 may display notification information for each specific application program without displaying summary information for each notification for the application program. For example, when the detail close indicator 219 corresponding to Gmail is selected in the screen 215 of FIG. 2, the controller 801 may display notification information for each application program again as depicted in the screen 205.

Otherwise, when one element of summary information is selected among summary information for each notification for the specific application program by the user, the controller 801 may execute the specific application program, and then display data corresponding to the selected summary information. For example, when one element of summary information is selected among summary information for each notification corresponding to Gmail in the screen 215 of FIG. 2, the controller 801 may execute Gmail, and then display an email corresponding to the selected summary information as depicted in the screen 223.

In the second embodiment, when an email (for example, in Gmail or an e-mail application set by a user), a text message (for example, a short message, a multimedia message, or an instant message), or a game message is received from the outside or an event is generated, the controller 801 may display the status bar including at least one notification icon for notifying of reception of the message or the email, or generation of the event.

Further, when the status bar is selected by the user, the controller 801 may display the notification list. For example, when a gesture is input on the status bar, the controller 801 may determine that the status bar is selected. Here, the gesture may be a touch, a double touch, a long touch, a slide down, or the like. For example, when a slide down is input on the status bar 303 as depicted in the screen 301 of FIG. 3, the controller 801 may determine that the status bar 303 is selected.

Here, the notification list may include an icon of a specific application program providing the received message or the generated event and the number of notifications for each application program. Further, the number of notifications may represent the number of received messages or the number of generated events for a specific application program.

Further, when any one among an icon and the number of notifications for the specific application program is selected among one or more elements of the notification information included in the notification list by the user, the controller 801 may execute the specific application program. For example, when the number of notifications 307 corresponding to Gmail is selected in the screen 305 of FIG. 3, the controller 801 may execute a corresponding application program, that is, Gmail, as depicted in the screen 311.

Otherwise, when a first gesture is input on one or more elements of notification information included in the notification list by the user, the electronic device may display summary information for each notification for a specific application program. For example, the first gesture may be a two-touch slide down. Here, the summary information for each notification refers to summary information about the received message or the generated event. For example, when the two-touch slide down 309 is input on notification information for Gmail in the screen 305 of FIG. 3, the controller 801 may display the icon and the number of notifications 315 of Gmail, and summary information 317 corresponding to a plurality of received emails related to Gmail as depicted in the screen 313.

Further, when a second gesture is input on summary information for each notification for a specific application program by the user, the electronic device may display notification information for each application program without displaying summary information for each notification for the specific application program. For example, the second gesture may be a two-touch slide up. For example, when the two-touch slide up 319 is input on the summary information for each notification corresponding to Gmail in the screen 313 of FIG. 3, the controller 801 may display the notification information for each application program again as depicted in the screen 305.

Otherwise, when one element of summary information is selected among summary information for each notification for the specific application program by the user, the controller 801 may execute the specific application program, and then display data corresponding to the selected summary information. For example, when one element of summary information is selected among summary information for each notification corresponding to Gmail in the screen 313 of FIG. 3, the controller 801 may execute Gmail, and then display an email corresponding to the selected summary information as depicted in the screen 321.

In the third embodiment, when an email (for example, in Gmail or an e-mail application set by a user), a text message (for example, a short message, a multimedia message, or an instant message), or a game message is received from the outside or an event is generated, the controller 801 may display the status bar including at least one notification icon for notifying of reception of the message or the email, or generation of the event.

Further, when the status bar is selected by the user, the controller 801 may display the notification list. For example, when a gesture is input on the status bar, the controller 801 may determine that the status bar is selected. Here, the gesture may be a touch/tap, a double touch/tap, a long touch, a slide down, or the like. For example, when a slide down is input on the status bar 403 as depicted in the screen 401 of FIG. 4, the controller 801 may determine that the status bar 403 is selected.

Here, the notification list may include an icon of a specific application program providing a received message or a generated event for each application program, the predetermined number of elements of summary information about a received message or a generated event related to a specific application program, and a summary extension indicator making a request for extension of the predetermined number of elements of summary information.

Further, the controller 801 may execute a specific application program corresponding to notification information when any one among notification information included in the notification list is selected by the user. For example, when the summary information corresponding to Gmail is selected in the screen 405 of FIG. 4, the controller 801 may execute a corresponding application program, that is, Gmail, as depicted in the screen 413.

Otherwise, when a summary extension indicator for a specific application program is selected by the user, the controller 801 may display an icon, summary information for entire notifications, and a summary reduction indicator for the specific application program. For example, when the summary extension indicator 409 for Gmail is selected in the screen 405 of FIG. 4, the controller 801 may display the icon 417, the summary information for entire notifications 421, and the summary reduction indicator 419 for Gmail as depicted in the screen 415.

Further, the when the summary information for the entire notifications for the specific application program is selected by the user, the controller 801 may execute the specific application program corresponding to the summary information for the entire notifications. For example, when the summary information for the entire notifications 421 corresponding to Gmail is selected in the screen 415 of FIG. 4, the controller 801 may execute the corresponding application program, that is, Gmail, as depicted in the screen 413.

Otherwise, when the summary reduction indicator for the specific application program is selected by the user, the controller 801 may display the predetermined number of elements of summary information without displaying the summary information for the entire notifications. For example, when the summary reduction indicator 419 corresponding to Gmail is selected in the screen 415 of FIG. 4, the controller 801 may display the predetermined number of elements of summary information of the emails for Gmail as depicted in the screen 405.

Through the aforementioned operations, according to the various embodiments of the present disclosure, there is suggested the apparatus and the method of displaying a notification in an electronic device, thereby improving user's convenience for notification information.

The device and the method of executing the function in the electronic device according to the various embodiments of the present disclosure may be implemented by computer readable codes in a nontransitory computer readable recording medium. The nontransitory computer-readable recording medium includes all the types of recording devices in which data readable by a computer system are stored. As for such a recording medium, for example, a Read Only Memory (ROM), a Random Access Memory (RAM), an optical disc, a magnetic tape, a floppy disc, a hard disc, or a non-volatile memory may be used. In addition, the computer-readable recording medium may be stored with codes which are distributed in computer systems connected by a network such that the codes can be read and executed by a computer in a distributed method.

In the above description, although a concrete embodiment such as an electronic device has been described, various modifications may be implemented without departing from the scope of the present disclosure. Therefore, it will be apparent that the claims of the present disclosure should be defined by the equivalents of the claims as well as the claims instead of the described embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus for displaying a notification in an electronic device, the apparatus comprising:
a touch screen configured to display a status bar including at least one notification icon; and
at least one processor configured to:
display at least one notification information including an icon and a number of notifications of an application program for each application program when the status bar is selected,
when a predetermined first gesture to the at least one notification information is input, execute an application program corresponding to a selected notification information,
when a predetermined second gesture to the at least one notification information is input, display summary information corresponding to the number of notifications included in the selected notification information, and
when a notification included in the displayed summary information of the notification information is selected, execute the application program corresponding to the selected notification and sequentially display data associated with the selected notification by the executed application program,
wherein the notification information includes a detail open indicator configured to make a request for display of the summary information corresponding to the number of notifications included in the notification information.

2. The apparatus of claim 1, wherein, when a predetermined third gesture is input, the at least one processor is further configured to display the notification information for each application program again.

3. The apparatus of claim 2, wherein the first gesture comprises a touch/tap gesture, the second gesture comprises a two-touch slide down gesture, and the third gesture comprises a two-touch slide up gesture.

4. The apparatus of claim 3, wherein, when the
detail open indicator is selected, the at least one processor is further configured to:
display summary information corresponding to the number of notifications included in the notification information, and
change and display the detail open indicator to be a detail close indicator.

5. The apparatus of claim 4, wherein, when the detail close indicator is selected, the at least one processor is further configured to display the notification information for each application program again.

6. An apparatus for displaying a notification in an electronic device, comprising:
a touch screen configured to display a status bar including at least one notification icon;
at least one processor configured to:
display at least one notification information including an icon of an application program for each application program, summary information about a predetermined number of notifications of the application program and detail extension indicator configured to make a request for extension of the summary information, when the status bar is selected,
when the at least one notification information is selected, execute an application program corresponding to a selected notification information, and
when a notification included in the summary information of the notification information is selected, execute the application program corresponding to the selected notification and sequentially display data associated with the selected notification by the executed application program.

7. The apparatus of claim 6, wherein, when the summary extension indicator is selected, the at least one processor is further configured to:
display entire summary information about all of the notification icons of the application program, and
change and display the summary extension indicator to be a summary reduction indicator.

8. The apparatus of claim 7, wherein, when the summary reduction indicator is selected, the at least one processor is further configured to:
change and display the entire summary information to be the summary information, and
change and display the summary reduction indicator to be the summary extension indicator.

9. A method of displaying a notification in an electronic device, the method comprising:
displaying a status bar including at least one notification icon;
displaying at least one notification information including an icon and a number of notifications of an application program for each application program when the status bar is selected;
when a predetermined first gesture to the at least one notification information is input, executing an application program corresponding to a selected notification information;
when a predetermined second gesture to the at least one notification information is input, displaying summary information corresponding to the number of notifications included in the selected notification information; and
when a notification included in the displayed summary information of the notification information is selected, executing the application program corresponding to the selected notification and sequentially displaying data associated with the selected notification by the executed application program,
wherein the notification information includes a detail open indicator configured to make a request for display of the summary information corresponding to the number of notifications included in the notification information.

10. The method of claim 9, further comprising:
displaying the notification information for each application program again when a predetermined third gesture is input.

11. The method of claim 10, wherein the first gesture comprises a touch/tap gesture, the second gesture comprises a two-touch slide down gesture, and the third gesture comprises a two-touch slide up gesture.

12. The method of claim 11, further comprising:
displaying summary information corresponding to the number of notifications included in the notification information, and
changing and displaying the detail open indicator to be a detail close indicator when the detail open indicator is selected.

13. The method of claim 12, further comprising:
displaying the notification information for each application program again when the detail close indicator is selected.

14. A method of displaying a notification in an electronic device, the method comprising:
displaying a status bar including at least one notification icon;
displaying at least one notification information including an icon of an application program for each application program, summary information about a predetermined number of notifications of the application program, and a detail extension indicator making a request for extension of the summary information when the status bar is selected;
when the at least one notification information is selected, executing an application program corresponding to the selected notification information; and
when a notification included in the summary information of the notification information is selected, executing the application program corresponding to the selected notification and sequentially displaying data associated with the selected notification by the executed application program.

15. The method of claim 14, further comprising:
displaying entire summary information about all of the notification icons of the application program, and
changing and displaying the summary extension indicator to be a summary reduction indicator when the summary extension indicator is selected.

16. The method of claim 15, further comprising:
changing and displaying the entire summary information to be the summary information, and
changing and displaying the summary reduction indicator to be the summary extension indicator when the summary reduction indicator is selected.

* * * * *